United States Patent
Rehak (10) Patent No.: US 10,574,679 B2
(45) Date of Patent: Feb. 25, 2020

(54) IDENTIFYING A SECURITY THREAT TO A WEB-BASED RESOURCE

(71) Applicant: Cisco Technology, Inc., San Jose, CA (US)

(72) Inventor: Martin Rehak, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 131 days.

(21) Appl. No.: 15/421,969

(22) Filed: Feb. 1, 2017

(65) Prior Publication Data

US 2018/0219890 A1 Aug. 2, 2018

(51) Int. Cl.
*H04L 29/06* (2006.01)
*G06N 5/04* (2006.01)

(52) U.S. Cl.
CPC .......... *H04L 63/1425* (2013.01); *G06N 5/04* (2013.01); *H04L 63/14* (2013.01)

(58) Field of Classification Search
None
See application file for complete search history.

(56) References Cited

U.S. PATENT DOCUMENTS

| | | | | |
|---|---|---|---|---|
| 6,973,459 B1 * | 12/2005 | Yarmus | ............. | G06F 17/30466 707/778 |
| 7,107,192 B1 * | 9/2006 | Cung | ...................... | G06F 17/18 382/224 |
| 8,495,072 B1 * | 7/2013 | Kapoor | ................. | H04W 12/02 707/754 |
| 8,997,227 B1 * | 3/2015 | Mhatre | ............... | H04L 63/1416 726/23 |
| 9,049,221 B1 * | 6/2015 | Yen | ..................... | H04L 63/1408 |
| 9,344,441 B2 | 5/2016 | Kohout et al. | | |
| 9,432,393 B2 | 8/2016 | Bartos et al. | | |
| 9,516,053 B1 * | 12/2016 | Muddu | ............... | H04L 63/1425 |

(Continued)

FOREIGN PATENT DOCUMENTS

EP 2571225 A1 3/2013

OTHER PUBLICATIONS

Kanaskar, et al., "A Dynamical System Approach to Intrusion Detection Using System Call Analysis," SEKE 2007, The 19th International Conference on Software Engineering & Knowledge Engineering, Jul. 2007, 8 pages.

(Continued)

*Primary Examiner* — Jason Chiang
(74) *Attorney, Agent, or Firm* — Edell, Shapiro & Finnan, LLC (57) ABSTRACT

Access logs associated with user requests for a web-based resource are monitored. Parameter(s) that index records of the web-based resource are identified. A baseline distribution(s) of values of the parameter(s) are generated and, based on the baseline distribution(s), a baseline entropy of the parameter(s) is calculated. A distribution(s) of values of the parameters associated with user requests made by a particular user is generated and, based on the distribution(s), an entropy of the parameter(s) associated with the user requests is calculated. The entropy is compared to the baseline entropy. If a difference between the baseline entropy and the entropy exceeds a threshold, it is determined that the particular user poses a security threat to the web-based resource.

20 Claims, 7 Drawing Sheets

(56) References Cited

U.S. PATENT DOCUMENTS

| | | | |
|---|---|---|---|
| 9,516,062 B2* | 12/2016 | Cooper | H04L 63/10 |
| 9,531,742 B2 | 12/2016 | Kohout et al. | |
| 10,027,694 B1* | 7/2018 | Gupta | H04L 63/1416 |
| 2007/0083928 A1 | 4/2007 | Mattsson et al. | |
| 2007/0245420 A1* | 10/2007 | Yong | H04L 41/28 726/23 |
| 2008/0271143 A1 | 10/2008 | Stephens et al. | |
| 2012/0117254 A1* | 5/2012 | Ehrlich | H04L 41/142 709/228 |
| 2013/0291108 A1* | 10/2013 | Yu | G06F 21/55 726/23 |
| 2015/0082377 A1* | 3/2015 | Chari | H04L 63/20 726/1 |
| 2015/0101053 A1 | 4/2015 | Sipple | |
| 2015/0262077 A1* | 9/2015 | White | G06N 99/005 706/12 |
| 2015/0313529 A1* | 11/2015 | Nevo | A61B 5/165 600/595 |
| 2015/0341376 A1* | 11/2015 | Nandy | H04L 63/1408 726/23 |
| 2016/0080404 A1* | 3/2016 | Kohout | H04L 63/1425 726/23 |
| 2016/0080413 A1* | 3/2016 | Smith | H04L 63/1458 726/23 |
| 2017/0070521 A1* | 3/2017 | Bailey | H04L 63/1416 |
| 2018/0176241 A1* | 6/2018 | Manadhata | H04L 63/1425 |

OTHER PUBLICATIONS

Eberle, et al., "Insider Threat Detection Using Graph-Based Approaches," Journal of Applied Security Research, vol. 6, Issue 1, Jan. 2011, 5 pages.

Tendler, "Adopting a User Behavior Analytics (UBA) Solution," http://www.smartdatacollective.com/idan-tendler/326260/adopting-user-behavior-analytics-uba-solution, Jun. 25, 2015, 3 pages.

Scrapehero, "How to prevent getting blacklisted while scraping," https://www.scrapehero.com/how-to-prevent-getting-blacklisted-while-scraping/, Jul. 31, 2014, 6 pages.

* cited by examiner

IDENTIFYING A SECURITY THREAT TO A WEB-BASED RESOURCE

TECHNICAL FIELD

The present disclosure relates to detecting a security threat to a web-based resource.

BACKGROUND

Web-based resources include entities (e.g., information systems, databases, document repositories, etc.) that may be accessed via the web. An organization that owns a web-based resource may take measures to protect the web-based resource (e.g., where the web-based resource is proprietary). However, web-based resources are often susceptible to insider security threats. An insider security threat to a web-based resource may be caused by a person within an organization who has the ability to access a proprietary web-based resource.

DESCRIPTION OF EXAMPLE EMBODIMENTS

Overview

Presented herein are techniques for determining whether a security threat to a resource, such as a web-based resource, has occurred based on user access activity to the resource. Access logs associated with user requests for a web-based resource are monitored. Based on the access logs, one or more parameters that index records of the web-based resource are identified. A baseline distribution of values of the one or more parameters is generated and, based on the baseline distribution, a baseline entropy of the one or more parameters is calculated. A distribution of values of the one or more parameters associated with user requests made by a particular user is generated and, based on the distributions, an entropy of the one or more parameters associated with the user requests is calculated. The entropy is compared to the baseline entropy. If a difference between the baseline entropy and the entropy exceeds a threshold, it is determined that the particular user poses a security threat to the web-based resource.

Example Embodiments

Figure 1:
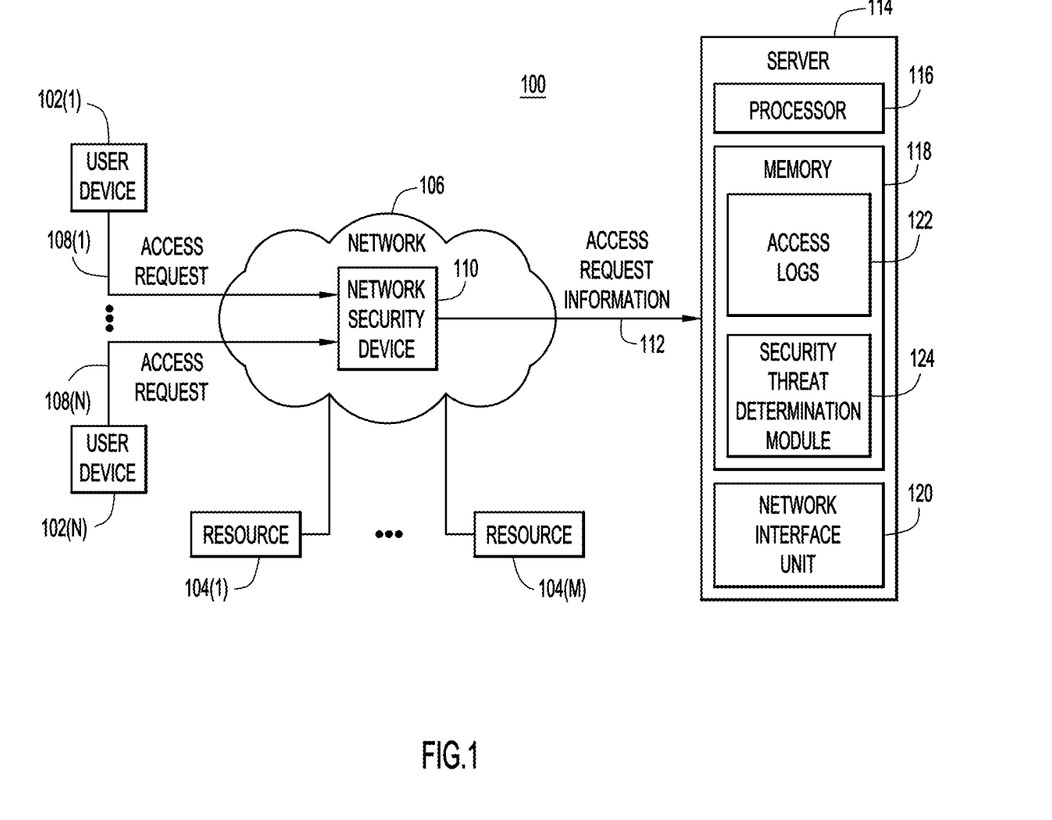
FIG. 1 is a block diagram illustrating a computing/networking environment configured to determine whether a security threat exists with respect to a resource, according to an example embodiment.

With reference made to FIG. 1, shown is a computing/networking environment 100 configured to determine whether a particular user poses an insider security threat in accordance with examples presented herein. The environment 100 includes one or more user devices 102(1)-102(N) and one or more web-based resources 104(1)-104(M). User devices 102(1)-102(N) are operable to communicate with web-based resources 104(1)-104(M) over a network 106. More specifically, user devices 102(1)-102(N) may send, via network 106, access requests 108(1)-108(N) that request access to web-based resources 104(1)-104(M). In an example, access requests 108(1)-108(N) are Hypertext Transfer Protocol (HTTP) requests made to a Uniform Resource Locator (URL). User devices 102(1)-102(N) may send multiple access requests per user device.

A network security device 110 intercepts the access request 108(1)-108(N). The network security device 10 may be, for example, a firewall, intrusion protection system, or other network security appliance.

The web-based resources 104(1)-104(M) may be referents of any web resource identifier, such as a Uniform Resource Identifier (URI) (e.g., URL) or Internationalized Resource Identifier (IRI).

The system includes a server 114 that is used to analyze information about access requests 108(1)-108(N) made by users. The server 114 includes one or more processors 116, a memory 118 and a network interface unit 120. The memory 118 may be read only memory (ROM), random access memory (RAM), magnetic disk storage media devices, optical storage media devices, flash memory devices, electrical, optical, or other physical/tangible memory storage devices. Thus, in general, the memory 118 may comprise one or more tangible (non-transitory) computer readable storage media (e.g., a memory device) encoded with software comprising computer executable instructions and when the software is executed (by the processor 116) it is operable to perform the operations described herein.

Based on the access requests 108(1)-108(N), the network security device 110 (e.g., a firewall) sends access request information 112 to the server 114. The access request information may include the number of access requests associated with a particular web-based resource, the number of access requests associated with a particular user device, the timestamp of the access request, etc.

The memory 118 of server 114 stores access logs 122 associated with access requests 108(1)-108(N). The access logs 122 include information regarding previous user behavior with regard to access requests for web-based resources 104(1)-104(M). For example, the access logs 122 may include previous access request information transmitted by the network security device 110. The security threat determination module 124 consists of software instructions executed by the processor 116 to detect a security threat. In particular, based on the access logs 122 and access request information 112, the security threat determination module 124 determines whether a particular user's access request activity poses a security threat to one of the web-based resources 104(1)-104(M). The security threat determination module 124 is described in greater detail below.

It should be understood that the functions of the security threat determination module 124 may be implemented by the network security device 110, instead of by a separate device, e.g., the server 114.

Figure 2:
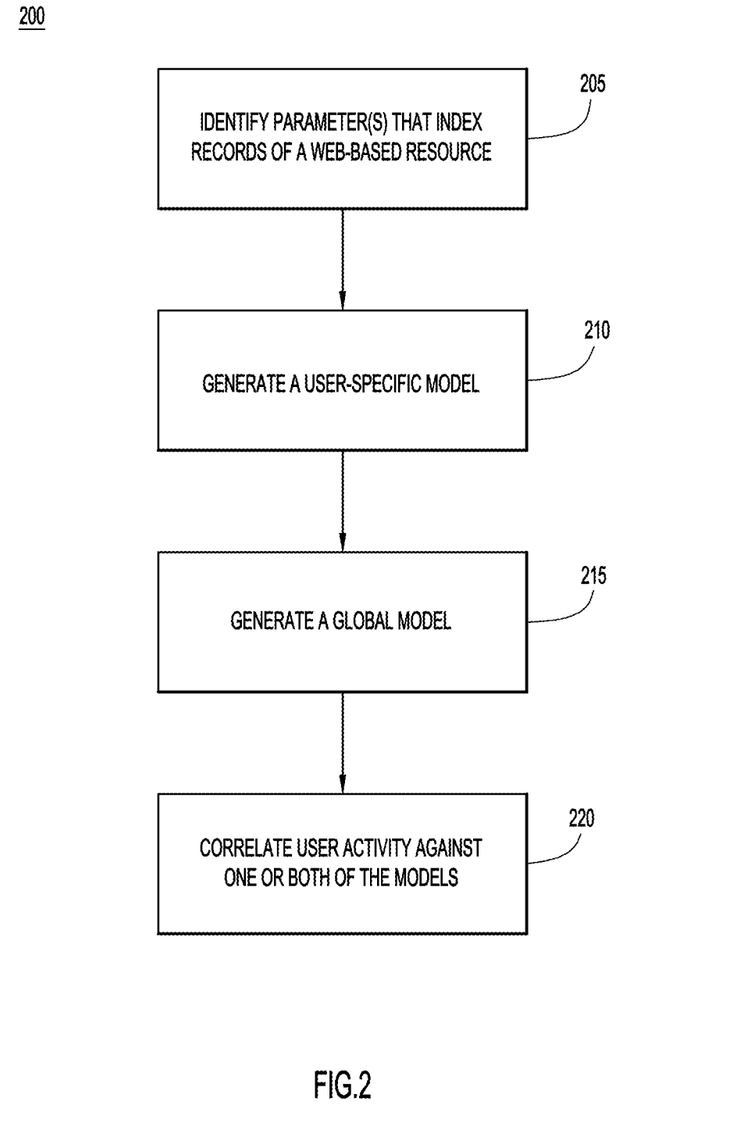
FIG. 2 is a flow diagram of a method in accordance with examples presented herein.

FIG. 2 is a high-level flowchart of a method 200 in accordance with examples presented herein. At 205, by monitoring user access requests, one or more parameters are identified that index records of a web-based resource. At 210, a user-specific model is generated from the one or more parameters. The operations 205 and 210 are further described below with respect to FIG. 3. At 215, a global model is generated from the one or more parameters identified in 205, as is further described below with respect to FIG. 4. At block 220, user activity is correlated against one or both of the user-specific model or global model to determine if a threat to the resource is occurring. Details associated with operation 220 are further described below with respect to FIG. 5.

Figure 3:
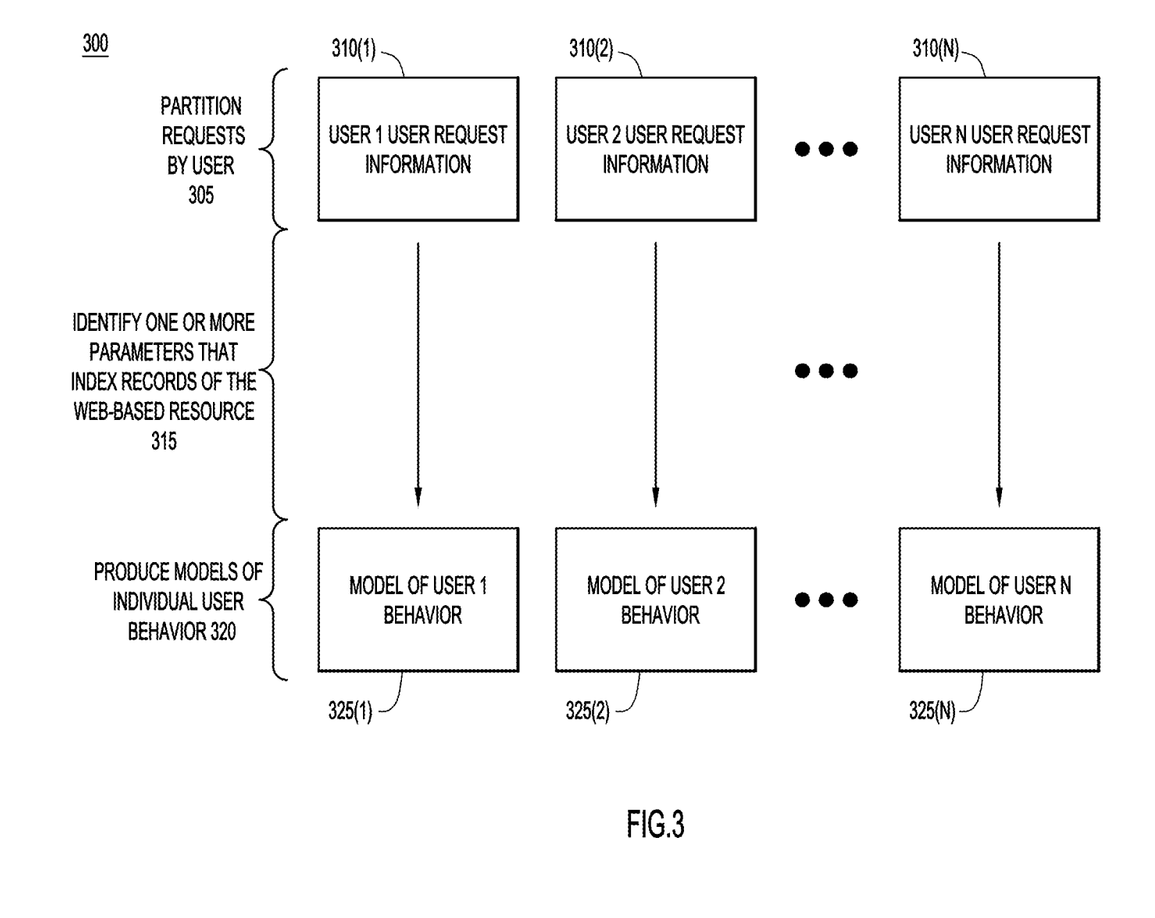
FIG. 3 is a flow diagram illustrating a technique for modeling individual user behavior as part of the process of detecting a security threat to a resource, according to an example embodiment.

With reference now to FIG. 3 and continued reference to FIG. 1, a flow diagram is shown that illustrates a process 300 for producing models of individual user behavior (the aforementioned user-specific models referred to in connection with FIG. 2), in accordance with examples presented herein. The process 300 may be performed by the security threat determination module 124 at server 114. At 305, user request information representing user requests to one or more resources 104(1)-104(M) is partitioned by individual users (e.g., user 1 user request information 310(1), user 2 user request information 310(2), and user N user request information 310(N)). The user request information that is partitioned may be accumulated over a predetermined period of time based on access requests 108(1)-108(N) received by the network security device 110 from user devices 102(1)-102(N).

At 315, the security threat determination module 124 identifies one or more parameters that index through records of one of the web-based resources 104(1)-104(M). The parameter(s) may include user identification (e.g., a software-issued identification that identifies the user), user status (e.g., whether the user is active), session identifiers (e.g., identifiers used to delineate between individual user sessions), and/or user role (e.g., the role assigned to a user within an organization). The parameter(s) may include parameter(s) contained in a URI or subsections of a URI path.

The security threat determination module 124 may determine which parameters index records of the web-based resource based on the respective entropies of the parameters. In an example, entropy may correspond to the expected number of records (e.g., customer records) queried by a web-based resource. Entropy may be estimated, for example, on a per-session basis, for all requests from a user within a given timeframe, or for a particular number of successive requests to a particular web-based resource. In the latter situation, the entropy may ignore access requests to other web-based resources that are made between successive requests to the particular web-based resource.

As an example, a request by a user may take the form of a URI, such as: http://example.com/clientlist?clientid=145679554&status=active&session=aa123b5f45$role=audit. In this example, there are four candidate parameters (clientid, status, session, and role), any one or more of which, the security threat determination module 124 may use to potentially identify as indexing records of a web-based resource.

Candidate parameters having relatively low or very high entropy may be unreliable baselines against which to compare user behavior. Generally, candidate parameters selected from a list of choices (e.g., user role, country, state, etc.), including status and role, have relatively low entropy. For example, a user role may not index records of the web-based resource because the role of a user may be constant (e.g., the user may always have the role of "audit"), which corresponds to a relatively low entropy. Meanwhile, session identifiers (or timestamps, etc.) may not index records of the web-based resource because every session may include a different session identifier, corresponding to a relatively very high entropy. Session identifiers may be used to delineate between user sessions or to discover concurrent sessions. In an example, the entropy of a session identifier may be the logarithm of the number of sessions/users per day. Session identifiers may be confined to a specific time range and may not be repeated over longer time intervals.

However, the "clientid" parameter may index records of the web-based resource because it is a request parameters having mid- to high-range entropy values, and the entropy corresponds to the expected number of records (e.g., customer records) queried by the web-based resource(s). The entropy of the clientid parameter may be close to a logarithm of a number of requests for a web-based resource, as entropy in this range is most likely useful. In this example, the security threat determination module 124 compares the entropy of the set of "clientid" values with the total number of requests and selects it as a parameter that indexes (counts) records of the web-based resource(s). More generally, the entropy of a parameter (e.g., clientid) may correspond to a usage distribution of one or more web-based resources by a user. If access request records are stored in a table format, the catch/re-catch theorem may be used to estimate the number of lines in the table, given certain usage assumptions.

In an example, the security threat determination module 124 identifies multiple user requests for web-based resources (e.g., pages or application programming interface methods). In this example, the users are employees of a company and the web-based resources are proprietary documents. Having determined that clientid indexes records, the security threat determination module 124 may remove the less relevant parameters (e.g., status, session, role, etc.), leaving only the clientid parameter:

user1: http://example.com/clientlist?clientid=145679554
user1: http://example.com/clientlist?clientid=145679554
user1: http://example.com/clientlist?clientid=145674444
user2: http://example.com/clientlist?clientid=145673333
user2: http://example.com/clientlist?clientid=145679554
user3: http://example.com/clientlist?clientid=145673333

Thus, in an example, the security threat determination module 124 analyzes HTTP access logs to automatically identify parameters that index records (e.g., customer IDs, contract IDs, etc.) in a system. As explained below, in an example, the security threat determination module 124 generates models of typical/baseline usage of the resource(s) accessed via a URL and notifies an administrator when a user attempts to crawl a disproportionate number of records compared to the past activity of the user and/or other users. The security threat determination module 124 may automatically and efficiently determine, with high sensitivity, whether certain user behavior (e.g., crawling behavior) poses a security threat.

As such, identifying one or more parameters may include: identifying one or more candidate parameters, wherein the one or more candidate parameters are associated with the user requests to the web-based resource; generating at least one distribution of values of the one or more candidate parameters; calculating, based on the at least one distribution of values of the one or more candidate parameters, respective entropies of the one or more candidate parameters; and determining, based on the respective entropies of the one or more candidate parameters, which of the one or more candidate parameters index the web-based resource. Further, determining which of the one or more candidate parameters index the web-based resource may include determining which of the respective entropies of the one or more candidate parameters are intermediate entropies of the respective entropies.

At 320, the security threat determination module 124 produces models of individual user behavior. For example, the security threat determination module 124 produces a model of user 1 behavior 325(1) based on user 1 user request information 310(1) and the parameter(s) that index records; a model of user 2 behavior 325(2) based on user 2 user request information 310(2) and the parameter(s) that index records; and a model of user N behavior 325(N) based on user N user request information 310(N) and the parameter(s) that index records.

Continuing with the above example, the security threat determination module 124 may maintain a histogram of parameter values and estimate the corresponding entropy for each user. For user1, there are two values (i.e., clientid values) 145679554 and 145674444. User1 requested access to records associated with clientid 145679554 twice and access to records associated with clientid 145674444 once. Thus, the histogram for user1 may correspond to the following data points: (145679554,2), (145674444,1).

The models 325(1)-325(N) may be updated on a continuous or periodic basis, based on user request information associated with access requests to one or more of the web-based resources.

Figure 4:
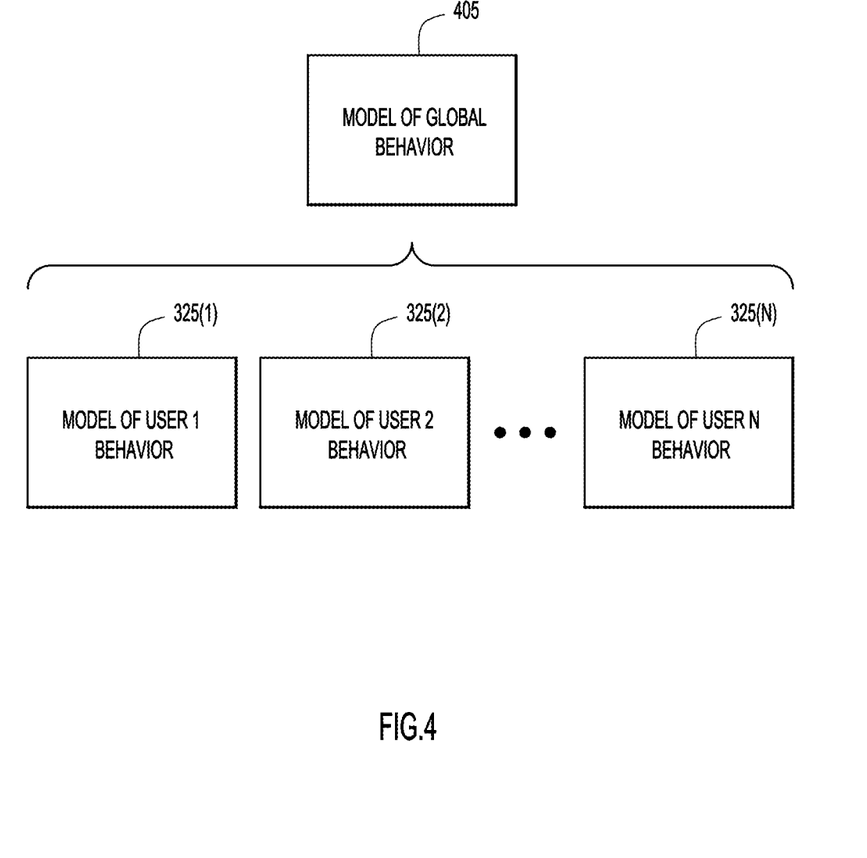
FIG. 4 is a diagram illustrating a composition of a model of global user behavior as part of the process of detecting a security threat to a resource, according to an example embodiment.

Reference is now made to FIG. 4. FIG. 4 shows a composition of a model of global behavior 405 in accordance with examples presented herein. More specifically, the security threat determination module 124 may generate a model of global behavior 405 based on the model of user 1 behavior 325(1), model of user 2 behavior 325(2), and/or model of user N behavior 325(N). In other words, the model of global behavior 405 may be associated with previous user requests made by a plurality of users (e.g., user 1, user 2, and/or user N, etc.). For instance, the model of global behavior 405 may include an aggregation of the models of individual user behaviors 325(1)-325(N). In an example, the model of global behavior 405 may include only an aggregation of models of the behaviors of individual users who share certain qualities (e.g., work function, location, etc.) with a particular user. One or more entropies associated with models of user behaviors 325(1)-325(N) and/or the model of global behavior 405 may be based on histogram(s) of parameter values. For example, continuing with the example above with respect to clientid values, the global behavior may be an aggregation of the data points for user1, user2, and user3.

As such, at least one baseline distribution of values of the one or more parameters may be associated with the user requests made by the particular user. Also, at least one baseline distribution of values of the one or more parameters may be associated with user requests made by a plurality of users. Generating the at least one baseline distribution of values may include generating a user-specific baseline distribution of values of the one or more parameters associated with user requests made by the particular user, and a global baseline distribution of values of the one or more parameters associated with user requests made by a plurality of users, and calculating a baseline entropy may comprise calculating a user-specific baseline entropy based on the user-specific baseline distribution of values and a global baseline entropy based on the global baseline distribution of values. The entropy may be compared to either or both of the user-specific baseline entropy and global baseline entropy. At least one baseline distribution may be a baseline histogram, and at least one distribution may be a histogram. Monitoring, identifying, generating at least one baseline distribution of values, and calculating a baseline entropy, may be performed for each of a plurality of web-based resources based on user requests made by each of a plurality of users. In particular, generating at least one distribution, calculating the entropy, comparing, and determining may be performed for each of a plurality of users.

Thus, FIGS. 3 and 4 illustrate, among other features, generating baseline models of user behavior, on both a global basis across numerous users, or on a user-specific basis. In another example, a global model may be generated without first calculating individual models (e.g., without first partitioning the requests at 305). The security threat determination module 124 may use these baseline models as a reference point indicative of standard/non-threatening user behavior. As described below, the security threat determination module 124 may consider user behavior that deviates from a baseline model(s) as an indication of a security threat to one of the web-based resources.

Figure 5:
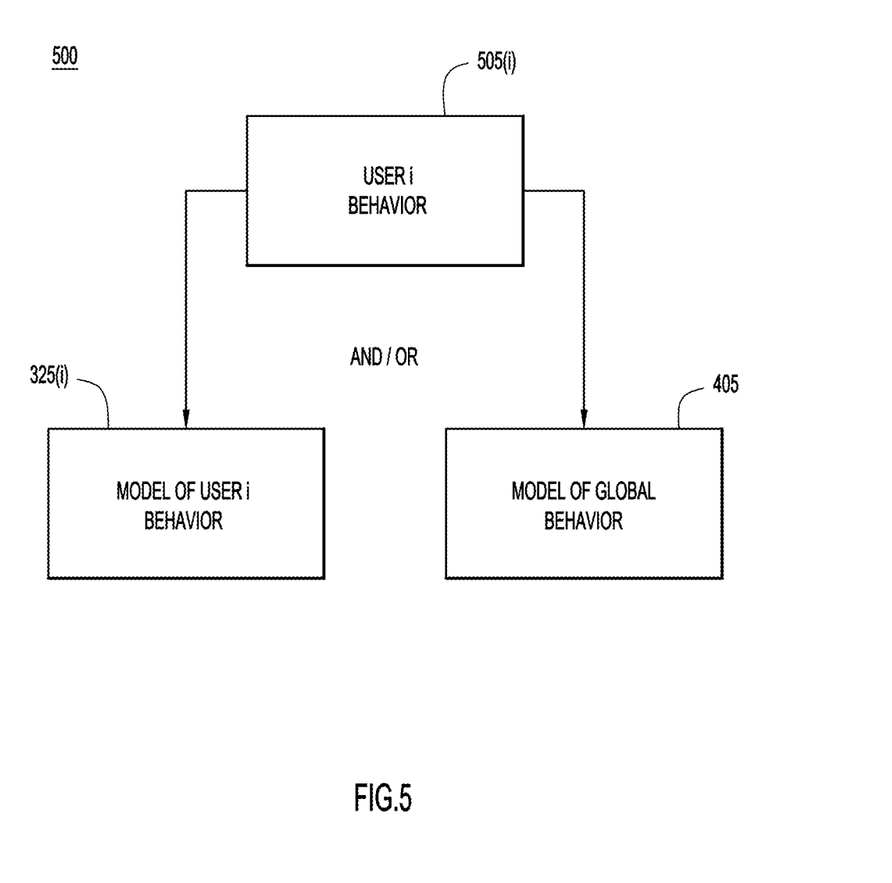
FIG. 5 is a block diagram depicting a technique of analyzing user behavior as part of the process of detecting a security threat to a resource, according to an example embodiment.

Turning to FIG. 5, a diagram is shown for a process 500 of analyzing user behavior 108(1)-108(N). The security threat determination module 124 may generate user i behavior 505(i) in a similar manner as the security threat determination module 124 generated models of user behavior 325(1)-325(N). Continuing with the example used to describe FIG. 2, the user identification has already been identified as having intermediate entropy and, therefore, indexing records of the web-based resource. The security threat determination module 124 may monitor user behavior and calculate the entropy for the associated user identifications. For example, the security threat determination module 124 produces a model of user i behavior 325(i) based on user i user request information and the parameter(s) that index records. In an example, user i behavior 505(i) may be based on histogram(s) of values of the parameter corresponding to the parameters of the model of user i behavior 325(i) and/or global behavior 336.

As further illustrated in FIG. 5, the security threat determination module 124 may correlate user behavior against models of user behavior. For example, user i behavior 505(i) may be correlated against the model of user i behavior 325(i) and/or global behavior 405. If a user behavior deviates from the corresponding model, the security threat determination module 124 may determine that the user behavior constitutes a security threat. For example, user i behavior 505(i) may have a similar entropy to the model of user i behavior 325(i) and the model of global behavior 336, in which case user 1 is determined not to be a security threat to the web-based resources. However, if user i behavior 505(i) has a high entropy (e.g., above a pre-set threshold) compared to the model of user i behavior 325(i) and the global behavior 405, user i may be determined to be a security threat to the web-based resources. A parameter having high entropy relative to an intermediate baseline entropy may indicate anomalous behavior consistent with a security threat (e.g., a user crawling an information system and systematically capturing large volumes of records). In an example, the security threat determination module 124 may perform an action in response to determining that a particular user poses a security threat to the web-based resource. For example, an alert may be provided that the particular user poses a security threat to the web-based resource. In another example, the user may be prevented from accessing the web-based resources.

Continuing with the "clientid" example above, the security threat determination module 124 may detect an anomaly/suspicious behavior where a user deviates from a typical entropy distribution in a session, thereby becoming an outlier with respect to a model of the individual user behavior and/or global user behavior. For example, the security threat determination module 124 may detect an anomaly if a user initiates a series of successive requests corresponding to high entropy, as follows.
user3: http://example.com/clientlist?clientid=111111111
user3: http://example.com/clientlist?clientid=111111112
user3: http://example.com/clientlist?clientid=111111113
user3: http://example.com/clientlist?clientid=111111114
user3: http://example.com/clientlist?clientid=111111115
user3: http://example.com/clientlist?clientid=111111116
user3: http://example.com/clientlist?clientid=111111117
user3: http://example.com/clientlist?clientid=111111118
user3: http://example.com/clientlist?clientid=111111119
user3: http://example.com/clientlist?clientid=111111110

In this example, the security threat determination module 124 would detect high-entropy suspicious behavior by user3, given the deviation from lower-entropy user3 model (e.g., previous) behavior. More specifically, this behavior indicates that user3 is crawling the records of one or more web-based resources to systematically capture a large volume of records.

The following is another example of the security threat determination module 124 identifying suspicious behavior. Sample behavior for user1, user2, and user3 is shown as follows.
user1: http://example.com/clientlist?clientid=145679554
user1: http://example.com/clientlist?clientid=145679554
user1: http://example.com/clientlist?clientid=145674444
user2: http://example.com/clientlist?clientid=145673333
user2: http://example.com/clientlist?clientid=145679554
user3: http://example.com/clientlist?clientid=145673333
user1: http://example.com/clientlist?clientid=145679554
user2: http://example.com/clientlist?clientid=145679554
user1: http://example.com/clientlist?clientid=145679557
user3: http://example.com/clientlist?clientid=145674444
user1: http://example.com/clientlist?clientid=145679553
user1: http://example.com/clientlist?clientid=145679554
user1: http://example.com/clientlist?clientid=145679555
user1: http://example.com/clientlist?clientid=145679556
user2: http://example.com/clientlist?clientid=145679554
user1: http://example.com/clientlist?clientid=145679557
user3: http://example.com/clientlist?clientid=145674444
user1: http://example.com/clientlist?clientid=145679558
user1: http://example.com/clientlist?clientid=145679559
user1: http://example.com/clientlist?clientid=145679560

The security threat determination module 124 may analyze the request parameters on a per-user basis, as follows:
user1: http://example.com/clientlist?clientid=145679554
user1: http://example.com/clientlist?clientid=145679554
user1: http://example.com/clientlist?clientid=145674444
user1: http://example.com/clientlist?clientid=145679554
user1: http://example.com/clientlist?clientid=145679557
user1: http://example.com/clientlist?clientid=145679553
user1: http://example.com/clientlist?clientid=145679554
user1: http://example.com/clientlist?clientid=145679555
user1: http://example.com/clientlist?clientid=145679556
user1: http://example.com/clientlist?clientid=145679557
user1: http://example.com/clientlist?clientid=145679558
user1: http://example.com/clientlist?clientid=145679559
user1: http://example.com/clientlist?clientid=145679560
user2: http://example.com/clientlist?clientid=145673333
user2: http://example.com/clientlist?clientid=145679554
user2: http://example.com/clientlist?clientid=145679554
user2: http://example.com/clientlist?clientid=145679554
user3: http://example.com/clientlist?clientid=145673333
user3: http://example.com/clientlist?clientid=145674444
user3: http://example.com/clientlist?clientid=145674444

In this example, the entropy of user2 and user3 behavior does not deviate significantly from the entropy of user2, user3, and/or global models. As such, user2 and user3 are not classified as security threats. However, the entropy of user1 behavior does deviate significantly from the entropy of user1 and/or global models. Specifically, starting at clientid=145679553, user1 exhibits suspicious behavior by initiating a series of successive requests corresponding to relatively high entropy, which is indicative of crawling behavior. As illustrated above, there are a high number of requests compared to past user1/global behavior, a high number of unique values of an index parameter, and a high entropy for index parameter requests compared to past user1/global behavior for this web-based resource. Therefore, the security threat determination module 124 detects the behavior of user1 as a security threat.

Figure 6:
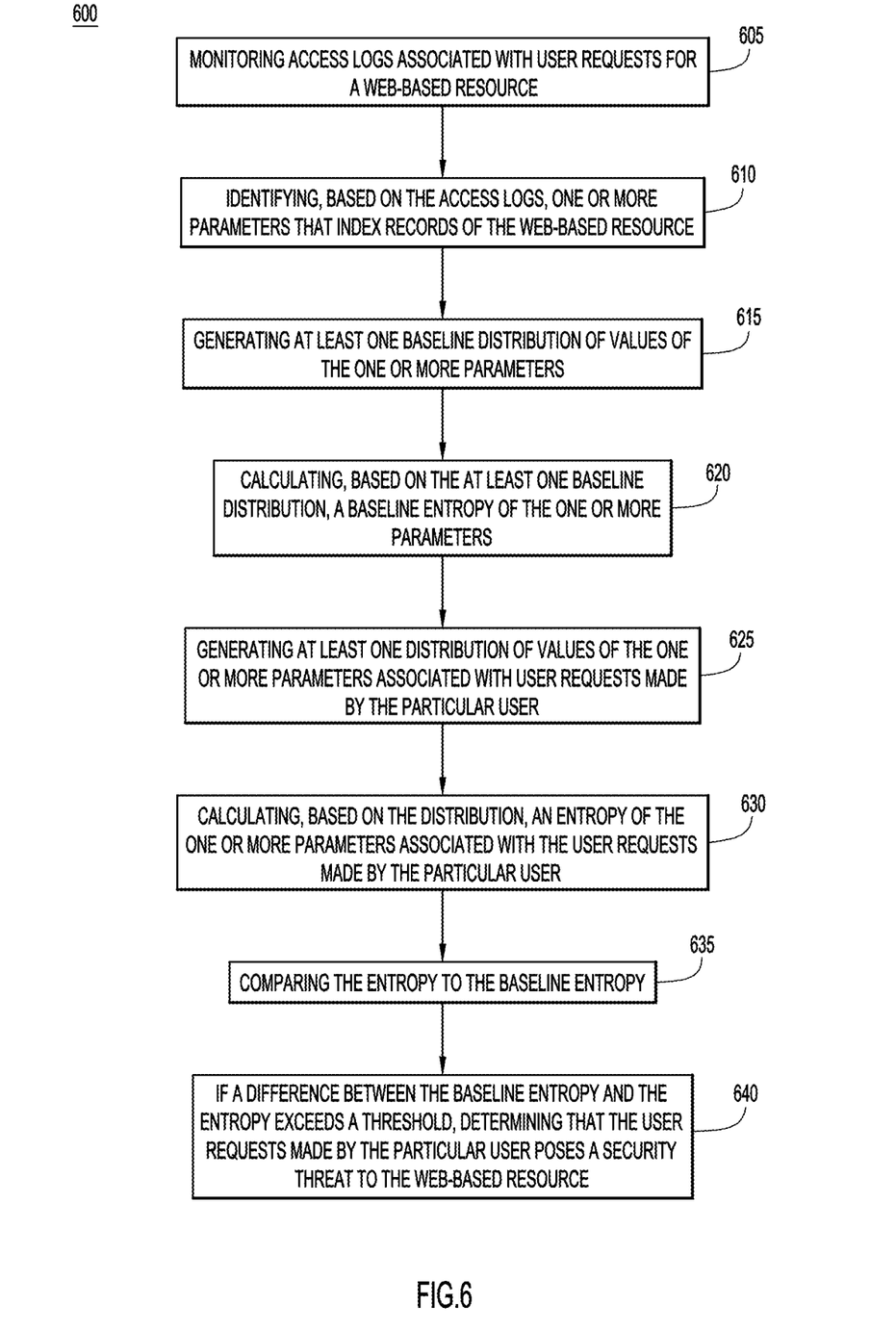
FIG. 6 is a flow diagram of a method in accordance with examples presented herein.

FIG. 6 is a flowchart of an overall method 600 in accordance with examples presented herein. At 605, access logs associated with user requests for a web-based resource are monitored. At 610, one or more parameters that index records of the web-based resource are identified based on the access logs. At 615, at least one baseline distribution of values of the one or more parameters is generated. At 620, a baseline entropy of the one or more parameters is calculated based on the at least one baseline distribution. At 625, at least one distribution of values of the one or more parameters associated with user requests made by the particular is generated. At 630, an entropy of the one or more parameters associated with the user requests made by the particular user is calculated based on the distribution. At 635, the entropy is compared to the baseline entropy. At 640, if a difference between the baseline entropy and the entropy exceeds a threshold, it is determined that the user requests made by the particular user poses a security threat to the web-based resource.

Figure 7:
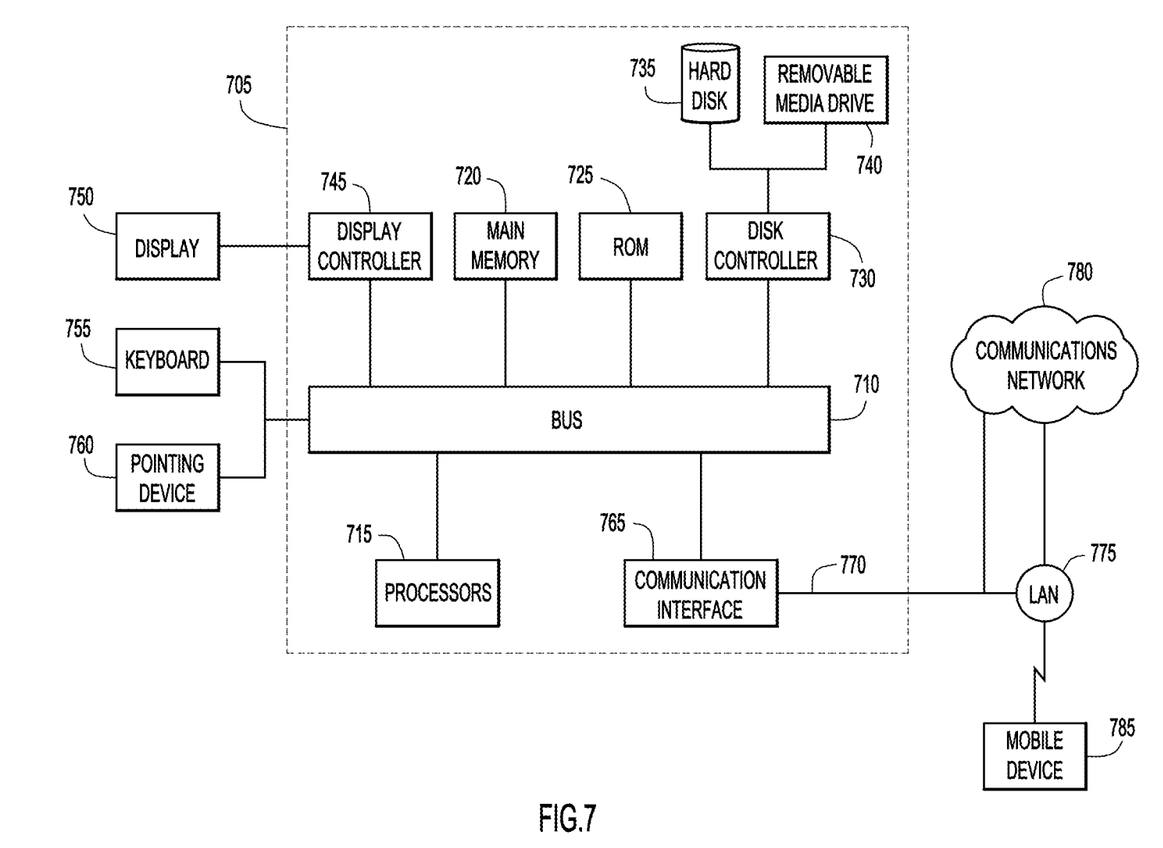
FIG. 7 is a block diagram of a computing device configured to execute security threat determination techniques, according to an example embodiment.

FIG. 7 illustrates a computer system 705 upon which the embodiments presented may be implemented. The computer system 705 includes a bus 710 or other communication mechanism for communicating information, and a processor 715 coupled with the bus 710 for processing the information. While the figure shows a single block 715 for a processor, it should be understood that the processors 715 represent a plurality of processing cores, each of which can perform separate processing. The computer system 705 also includes a main memory 720, such as a random access memory (RAM) or other dynamic storage device (e.g., dynamic RAM (DRAM), static RAM (SRAM), and synchronous DRAM (SD RAM)), coupled to the bus 710 for storing information and instructions to be executed by processor 715. In addition, the main memory 720 may be used for storing temporary variables or other intermediate information during the execution of instructions by the processor 715.

The computer system 705 further includes a read only memory (ROM) 725 or other static storage device (e.g., programmable ROM (PROM), erasable PROM (EPROM), and electrically erasable PROM (EEPROM)) coupled to the bus 710 for storing static information and instructions for the processor 715.

The computer system 705 also includes a disk controller 730 coupled to the bus 710 to control one or more storage devices for storing information and instructions, such as a magnetic hard disk 735, and a removable media drive 740 (e.g., floppy disk drive, read-only compact disc drive, read/write compact disc drive, compact disc jukebox, tape drive, and removable magneto-optical drive). The storage devices may be added to the computer system 705 using an appropriate device interface (e.g., small computer system interface (SCSI), integrated device electronics (IDE), enhanced-IDE (E-IDE), direct memory access (DMA), or ultra-DMA).

The computer system 705 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 705 may also include a display controller 745 coupled to the bus 710 to control a display 750, such as a cathode ray tube (CRT), Liquid Crystal Display (LCD), light emitting diode (LED) display, or other now known or hereinafter developed display technologies, for displaying information to a computer user. The computer system 705 includes input devices, such as a keyboard 755 and a pointing device 760, for interacting with a computer user and providing information to the processor 715. The pointing device 760, for example, may be a mouse, a trackball, or a pointing stick for communicating direction information and command selections to the processor 715 and for controlling cursor movement on the display 750. In addition, a printer may provide printed listings of data stored and/or generated by the computer system 705.

The computer system 705 performs a portion or all of the processing steps of the process in response to the processor 715 executing one or more sequences of one or more instructions contained in a memory, such as the main memory 720. Such instructions may be read into the main memory 720 from another computer readable medium, such as a hard disk 735 or a removable media drive 740. One or more processors in a multi-processing arrangement may also be employed to execute the sequences of instructions contained in main memory 720. In alternative embodiments, hard-wired circuitry may be used in place of or in combination with software instructions. Thus, embodiments are not limited to any specific combination of hardware circuitry and software.

As stated above, the computer system 705 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 705, for driving a device or devices for implementing the process, and for enabling the computer system 705 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 705 also includes a communication interface 765 coupled to the bus 710. The communication interface 765 provides a two-way data communication coupling to a network link 770 that is connected to, for example, a local area network (LAN) 775, or to another communications network 780 such as the Internet. For example, the communication interface 765 may be a wired or wireless network interface card to attach to any packet switched (wired or wireless) LAN. As another example, the communication interface 765 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 765 sends and receives electrical, electromagnetic or optical signals that carry digital data streams representing various types of information.

The network link 770 typically provides data communication through one or more networks to other data devices. For example, the network link 770 may provide a connection to another computer through a local area network 775 (e.g., a LAN) or through equipment operated by a service provider, which provides communication services through a communications network 780. The local network 770 and the communications network 780 use, for example, electrical, electromagnetic, or optical signals that carry digital data streams, and the associated physical layer (e.g., CAT 5 cable, coaxial cable, optical fiber, etc.). The signals through the various networks and the signals on the network link 770 and through the communication interface 765, which carry the digital data to and from the computer system 705 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 705 can transmit and receive data, including program code, through the network(s) 775 and 780, the network link 770 and the communication interface 765. Moreover, the network link 770 may provide a connection through a LAN 775 to a mobile device 785 such as a personal digital assistant (PDA) laptop computer, or cellular telephone.

In one form, a method is provided. The method comprises: monitoring access logs associated with user requests for a web-based resource; identifying, based on the access logs, one or more parameters that index records of the web-based resource; generating at least one baseline distribution of values of the one or more parameters; calculating, based on the at least one baseline distribution, a baseline entropy of the one or more parameters; generating at least one distribution of values of the one or more parameters associated with user requests made by a particular user; calculating, based on the distribution, an entropy of the one or more parameters associated with the user requests made by the particular user; comparing the entropy to the baseline entropy; and, if a difference between the baseline entropy and the entropy exceeds a threshold, determining that the particular user poses a security threat to the web-based resource.

In another form, an apparatus is provided. The apparatus comprises: a memory; and one or more processors configured to: monitor access logs associated with user requests for a web-based resource; identify, based on the access logs, one or more parameters that index records of the web-based resource; generate at least one baseline distribution of values of the one or more parameters; calculate, based on the at least one baseline distribution, a baseline entropy of the one or more parameters; generate at least one distribution of values of the one or more parameters associated with user requests made by the particular user; calculate, based on the distribution, an entropy of the one or more parameters associated with the user requests made by the particular user; compare the entropy to the baseline entropy; and, if a difference between the baseline entropy and the entropy exceeds a threshold, determine that the particular user poses a security threat to the web-based resource.

In another form, one or more non-transitory computer readable storage media are provided. The non-transitory computer readable storage media are encoded with instructions that, when executed by a processor, cause the processor to: monitor access logs associated with user requests for a web-based resource; identify, based on the access logs, one or more parameters that index records of the web-based resource; generate at least one baseline distribution of values of the one or more parameters; calculate, based on the at least one baseline distribution, a baseline entropy of the one or more parameters; generate at least one distribution of values of the one or more parameters associated with user requests made by the particular user; calculate, based on the distribution, an entropy of the one or more parameters associated with the user requests made by the particular user; compare the entropy to the baseline entropy; and if a difference between the baseline entropy and the entropy exceeds a threshold, determine that the particular user poses a security threat to the web-based resource.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method comprising:
monitoring access logs associated with hypertext transfer protocol requests made to a uniform resource locator for a web-based resource, wherein the access logs include an indication of a number of the hypertext transfer protocol requests made to the uniform resource locator for the web-based resource and one or more timestamps of the hypertext transfer protocol requests made to the uniform resource locator for the web-based resource;
identifying, based on the access logs, one or more parameters that index records of the web-based resource;
generating at least one baseline distribution of values of the one or more parameters;
calculating, based on the at least one baseline distribution of values, a baseline entropy of the one or more parameters;
generating at least one distribution of values of the one or more parameters associated with hypertext transfer protocol requests made by a particular user, wherein the at least one distribution of values includes at least one histogram including a mapping of the values of the one or more parameters associated with the hypertext transfer protocol requests made by the particular user and a number of the hypertext transfer protocol requests made by the particular user;
calculating, based on the at least one distribution of values, an entropy of the one or more parameters associated with the hypertext transfer protocol requests made by the particular user;
comparing the entropy to the baseline entropy; and
if a difference between the baseline entropy and the entropy exceeds a threshold, determining that the hypertext transfer protocol requests made by the particular user poses a security threat to the web-based resource.

2. The method of claim 1, wherein identifying the one or more parameters includes:
identifying one or more candidate parameters, wherein the one or more candidate parameters are associated with the hypertext transfer protocol requests to the uniform resource locator for the web-based resource;
generating at least one distribution of values of the one or more candidate parameters;
calculating, based on the at least one distribution of values of the one or more candidate parameters, respective entropies of the one or more candidate parameters; and
determining, based on the respective entropies of the one or more candidate parameters, which of the one or more candidate parameters index the web-based resource.

3. The method of claim 2, wherein determining which of the one or more candidate parameters index the web-based resource includes determining which of the respective entropies of the one or more candidate parameters are intermediate entropies of the respective entropies.

4. The method of claim 1, wherein the at least one baseline distribution of values of the one or more parameters is associated with the hypertext transfer protocol requests made by the particular user.

5. The method of claim 1, wherein the at least one baseline distribution of values of the one or more parameters is associated with hypertext transfer protocol requests made by a plurality of users.

6. The method of claim 1, wherein:
generating the at least one baseline distribution of values of the one or more parameters includes generating a user-specific baseline distribution of values of the one or more parameters associated with the hypertext transfer protocol requests made by the particular user, and a global baseline distribution of values of the one or more parameters associated with hypertext transfer protocol requests made by a plurality of users; and calculating the baseline entropy includes calculating a user-specific baseline entropy based on the user-specific baseline distribution of values of the one or more parameters associated with the hypertext transfer protocol requests made by the particular user and a global baseline entropy based on the global baseline distribution of values of the one or more parameters associated with the hypertext transfer protocol requests made by the plurality of users.

7. The method of claim 6, wherein comparing includes comparing the entropy to either or both of the user-specific baseline entropy and the global baseline entropy.

8. The method of claim 1, wherein the at least one baseline distribution of values includes at least one baseline histogram.

9. The method of claim 1, wherein monitoring, identifying, generating the at least one baseline distribution of values of the one or more parameters, and calculating the baseline entropy, are performed for each of a plurality of web-based resources based on hypertext transfer protocol requests made by each of a plurality of users.

10. The method of claim 9, wherein generating the at least one distribution of values of the one or more parameters associated with hypertext transfer protocol requests made by the particular user, calculating the entropy of the one or more parameters associated with the hypertext transfer protocol requests made by the particular user, comparing, and determining are performed for each of the plurality of users.

11. The method of claim 1, further comprising providing an alert that the particular user poses the security threat to the web-based resource.

12. An apparatus comprising:
a memory;
a communication interface configured to enable communications in a network; and
one or more processors coupled to the memory and to the communication interface, and configured to:
monitor access logs associated with hypertext transfer protocol requests made to a uniform resource locator for a web-based resource, wherein the access logs include an indication of a number of the hypertext transfer protocol requests made to the uniform resource locator for the web-based resource and one or more timestamps of the hypertext transfer protocol requests made to the uniform resource locator for the web-based resource;
identify, based on the access logs, one or more parameters that index records of the web-based resource;
generate at least one baseline distribution of values of the one or more parameters;
calculate, based on the at least one baseline distribution of values, a baseline entropy of the one or more parameters;
generate at least one distribution of values of the one or more parameters associated with hypertext transfer protocol requests made by a particular user, wherein the at least one distribution of values includes at least one histogram including a mapping of the values of the one or more parameters associated with the hypertext transfer protocol requests made by the particular user and a number of the hypertext transfer protocol requests made by the particular user;
calculate, based on the at least one distribution of values, an entropy of the one or more parameters associated with the hypertext transfer protocol requests made by the particular user;
compare the entropy to the baseline entropy; and
if a difference between the baseline entropy and the entropy exceeds a threshold, determine that the hypertext transfer protocol requests made by the particular user poses a security threat to the web-based resource.

13. The apparatus of claim 12, wherein the one or more processors are configured to identify the one or more parameters that index records of the web-based resource by:
identifying one or more candidate parameters, wherein the one or more candidate parameters are associated with the hypertext transfer protocol requests to the uniform resource locator for the web-based resource;
generating at least one distribution of values of the one or more candidate parameters;
calculating, based on the at least one distribution of values of the one or more candidate parameters, respective entropies of the one or more candidate parameters; and
determining, based on the respective entropies of the one or more candidate parameters, which of the one or more candidate parameters index the web-based resource.

14. The apparatus of claim 13, wherein the one or more processors are configured to determine which of the one or more candidate parameters index the web-based resource by determining which of the respective entropies of the one or more candidate parameters are intermediate entropies of the respective entropies.

15. The apparatus of claim 12, wherein the one or more processors are configured to:
generate a user-specific baseline distribution of values of the one or more parameters associated with the hypertext transfer protocol requests made by the particular user, and a global baseline distribution of values of the one or more parameters associated with hypertext transfer protocol requests made by a plurality of users; and
calculate a user-specific baseline entropy based on the user-specific baseline distribution of values of the one or more parameters associated with the hypertext transfer protocol requests made by the particular user and a global baseline entropy based on the global baseline distribution of values of the one or more parameters associated with the hypertext transfer protocol requests made by the plurality of users.

16. The apparatus of claim 15, wherein the one or more processors are configured to compare the entropy to either or both of the user-specific baseline entropy and the global baseline entropy.

17. One or more non-transitory computer readable storage media encoded with instructions that, when executed by a processor, cause the processor to:
monitor access logs associated with hypertext transfer protocol requests made to a uniform resource locator for a web-based resource, wherein the access logs include an indication of a number of the hypertext transfer protocol requests made to the uniform resource locator for the web-based resource and one or more timestamps of the hypertext transfer protocol requests made to the uniform resource locator for the web-based resource;
identify, based on the access logs, one or more parameters that index records of the web-based resource;
generate at least one baseline distribution of values of the one or more parameters;

calculate, based on the at least one baseline distribution of values, a baseline entropy of the one or more parameters;

generate at least one distribution of values of the one or more parameters associated with hypertext transfer protocol requests made by a particular user, wherein the at least one distribution of values includes at least one histogram including a mapping of the values of the one or more parameters associated with the hypertext transfer protocol requests made by the particular user and a number of the hypertext transfer protocol requests made by the particular user;

calculate, based on the at least one distribution of values, an entropy of the one or more parameters associated with the hypertext transfer protocol requests made by the particular user;

compare the entropy to the baseline entropy; and if a difference between the baseline entropy and the entropy exceeds a threshold, determine that the hypertext transfer protocol requests made by the particular user poses a security threat to the web-based resource.

18. The one or more non-transitory computer readable storage media of claim 17, wherein the instructions that cause the processor to identify the one or more parameters that index records of the web-based resource include instructions that cause the processor to:

identify one or more candidate parameters, wherein the one or more candidate parameters are associated with the hypertext transfer protocol requests to the uniform resource locator for the web-based resource;

generate at least one distribution of values of the one or more candidate parameters;

calculate, based on the at least one distribution of values of the one or more candidate parameters, respective entropies of the one or more candidate parameters; and determine, based on the respective entropies of the one or more candidate parameters, which of the one or more candidate parameters index the web-based resource.

19. The one or more non-transitory computer readable storage media of claim 18, wherein the instructions that cause the processor to determine which of the one or more candidate parameters index the web-based resource include instructions that cause the processor to determine which of the respective entropies of the one or more candidate parameters are intermediate entropies of the respective entropies.

20. The one or more non-transitory computer readable storage media of claim 17, wherein:

the instructions that cause the processor to generate the at least one baseline distribution of values of the one or more parameters include instructions that cause the processor to generate a user-specific baseline distribution of values of the one or more parameters associated with the hypertext transfer protocol requests made by the particular user, and a global baseline distribution of values of the one or more parameters associated with hypertext transfer protocol requests made by a plurality of users; and the instructions that cause the processor to calculate the baseline entropy include instructions that cause the processor to calculate a user-specific baseline entropy based on the user-specific baseline distribution of values of the one or more parameters associated with the hypertext transfer protocol requests made by the particular user and a global baseline entropy based on the global baseline distribution of values of the one or more parameters associated with the hypertext transfer protocol requests made by the plurality of users.

* * * * *